US008732680B2

(12) United States Patent
Barik et al.

(10) Patent No.: US 8,732,680 B2
(45) Date of Patent: May 20, 2014

(54) INTERMEDIATE FORM FOR BITWIDTH SENSITIVE APPLICATIONS AND USES THEREOF

(75) Inventors: Rajkishore Barik, Houston, TX (US); Krishna Nandivada Venkata, Andhra Pradesh (IN)

(73) Assignee: International Business Machines Corporation, Armonk, NY (US)

( * ) Notice: Subject to any disclaimer, the term of this patent is extended or adjusted under 35 U.S.C. 154(b) by 1075 days.

(21) Appl. No.: 12/388,884

(22) Filed: Feb. 19, 2009

(65) Prior Publication Data

US 2010/0211937 A1  Aug. 19, 2010

(51) Int. Cl.
*G06F 9/45* (2006.01)

(52) U.S. Cl.
USPC ............ 717/140; 717/136; 717/146; 717/151

(58) Field of Classification Search
None
See application file for complete search history.

(56) References Cited

U.S. PATENT DOCUMENTS

| | | | | |
|---|---|---|---|---|
| 5,339,428 A | * | 8/1994 | Burmeister et al. ........... | 717/146 |
| 6,072,952 A | * | 6/2000 | Janakiraman .................. | 717/155 |
| 6,901,466 B2 | * | 5/2005 | Porterfield ..................... | 710/104 |
| 7,000,213 B2 | | 2/2006 | Banerjee et al. | |
| 7,500,228 B2 | * | 3/2009 | Holmes et al. ................. | 717/136 |
| 7,805,582 B2 | * | 9/2010 | Yim et al. ....................... | 711/154 |
| 7,805,710 B2 | * | 9/2010 | North ............................. | 717/136 |
| 8,108,846 B2 | * | 1/2012 | Gschwind ...................... | 717/149 |
| 8,225,295 B2 | * | 7/2012 | Palsberg et al. ............... | 717/140 |
| 2002/0100031 A1 | * | 7/2002 | Miranda et al. ............... | 717/152 |
| 2004/0103410 A1 | * | 5/2004 | Sakai ............................. | 717/146 |
| 2005/0102658 A1 | * | 5/2005 | Li et al. ......................... | 717/140 |
| 2006/0020574 A1 | * | 1/2006 | Moona et al. ...................... | 707/2 |
| 2006/0225072 A1 | * | 10/2006 | Lari et al. ....................... | 717/175 |
| 2007/0022413 A1 | * | 1/2007 | Sule et al. ...................... | 717/140 |
| 2007/0038984 A1 | * | 2/2007 | Gschwind et al. ............ | 717/136 |
| 2007/0079304 A1 | * | 4/2007 | Zheng et al. .................. | 717/151 |
| 2007/0094646 A1 | * | 4/2007 | Higham ......................... | 717/136 |
| 2007/0226720 A1 | * | 9/2007 | Chen et al. .................... | 717/151 |
| 2007/0233766 A1 | * | 10/2007 | Gschwind ..................... | 708/490 |
| 2007/0256065 A1 | * | 11/2007 | Heishi et al. .................. | 717/151 |
| 2007/0256066 A1 | * | 11/2007 | Nakaike et al. ............... | 717/158 |
| 2008/0177941 A1 | * | 7/2008 | Yim et al. ...................... | 711/105 |

(Continued)

OTHER PUBLICATIONS

Arindam Mallik, Smart Bit-width Allocation for Low Power Optimization in a System C based ASIC Design Environment, Department of Electrical Engineering & Computer Science Northwestern University, 2006, pp. 4-17.*

(Continued)

*Primary Examiner* — Thuy Dao
*Assistant Examiner* — Mongbao Nguyen
(74) *Attorney, Agent, or Firm* — Ryan, Mason & Lewis, LLP

(57) ABSTRACT

Techniques for representing a program are provided. The techniques include creating one or more sub-variables for each of one or more variables in the program, and maintaining a single size of each of the one or more variables throughout a life-span of each of the one or more variables. Additionally, techniques for performing register allocation are also provided. The techniques include representing bit-width information of each of one or more variables in a powers-of-two representation, wherein the one or more variables comprise one or more variables in a program, coalescing the one or more variables, packing the one or more coalesced variables, and using the one or more packed variables to perform register allocation.

14 Claims, 15 Drawing Sheets

(56) References Cited

U.S. PATENT DOCUMENTS

| | | | | |
|---|---|---|---|---|
| 2008/0244543 | A1* | 10/2008 | Lapkowski | 717/146 |
| 2008/0320454 | A1* | 12/2008 | Suzuki et al. | 717/143 |
| 2009/0007085 | A1* | 1/2009 | Owen et al. | 717/146 |
| 2009/0064112 | A1* | 3/2009 | Inagaki et al. | 717/140 |
| 2009/0083721 | A1* | 3/2009 | Palsberg et al. | 717/140 |
| 2009/0193400 | A1* | 7/2009 | Baev et al. | 717/140 |

OTHER PUBLICATIONS

Fernando Magno Quintao Pereira, A Survey on Register Allocation, 2008, pp. 2-16.*

Fernando Magno Quintao Pereira, Register Allocation by Puzzle Solving, 2008, pp. 21-56.*

Mark Stephenson, Bitwidth Analysis with Application to Silicon Compilation, 2000, pp. 1-10.*

Rajkishore Barik, Optimal Bitwise Register Allocation using Integer Linear Programming, 2006, pp. 3-12.*

Alstrup, et al. Dominators in linear time. DIKU technical report, (35), 1996.

Barik et al. Enhanced bitwidth-aware register allocation. In CC, pp. 263-276, 2006.

Bouchez, et al. On the complexity of register coalescing. In International Symposium on Code Generation and Optimization, pp. 102-114, 2007.

Chaitin, G. Register allocation and spilling via graph coloring. SIGPLAN Notices, 17(6):98-105, Jun. 1982.

Cytron, et al. Efficiently computing static single assignment form and the control dependence graph. ACM Transactions on Programming Languages and Systems, 13(4):451-490, Oct. 1991.

Hack, et al. Register allocation for programs in ssa-form. In International Conference on Compiler Construction, pp. 247-262, 2006.

Pereira, et al. Register allocation via coloring of chordal graphs. In Proceedings of the 3rd Asian Symposium on Programming Languages and Systems, 2005.

Sarkar et al. Extended linear scan: an alternate foundation for global register allocation. In CC, 2007.

Mark Stephenson, Jonathan Babb, and Saman Amarasinghe. Bitwidth analysis with application to silicon compilation. In Proceedings of the SIGPLAN '00 Conference on Program Language Design and Implementation, pp. 108-120, 2000.

Tallam et al. Bitwidth aware global register allocation. In Proceedings of the 30th Symposium on Principles of programming languages, pp. 85-96, 2003.

Appel et al. Optimal spilling for CISC machines with few registers. In SIGPLAN'01 Conference on Programming Language Design and Implementation, pp. 243-253, 2001.

Bar-Noy, et al. Windows scheduling as a restricted version of bin packing. In SODA '04: Proceedings of the fifteenth annual ACM-SIAM symposium on Discrete algorithms, pp. 224-233, 2004.

Briggs, et al.. Improvements to graph coloring register allocation. ACM Transactions on Programming Languages and Systems, 16(3):428-455, May 1994.

Budimlic, et al. Fast copy coalescing and live-range identification. SIGPLAN Not., 37(5):25-32, 2002.

Callahan et al. Register allocation via hierarchical graph coloring. In Proceedings of the ACM SIGPLAN '91 Conference on Programming Language Design and Implementation, vol. 26, pp. 192-203, Jun. 1991.

Irani et al. Scheduling with conflicts, and applications to traffic signal control. In SODA '96: Proceedings of the seventh annual ACM-SIAM symposium on Discrete algorithms, pp. 85-94, 1996.

Knobe et al. Array SSA form and its use in parallelization. In Symposium on Principles of Programming Languages, pp. 107-120, 1998.

Lee, et al. Concurrent static single assignment form and constant propagation for explicitly parallel programs. In Languages and Compilers for Parallel Computing, pp. 114-130, 1997.

Li, et al. Speculative subword register allocation in embedded processors. In Proceedings of the LCPC 2004 Workshop, 2004.

Lueh, et al. Global register allocation based on graph fusion. In Languages and Compilers for Parallel Computing, pp. 246-265, 1996.

Park et al. Optimistic register coalescing. ACM Trans. Program. Lang. Syst., 26(4):735-765, 2004.

Poletto et al. Linear scan register allocation. ACM Transactions on Programming Languages and Systems, 21(5):895-913, 1999.

Traub, et al. Quality and speed in linear-scan register allocation. In SIGPLAN Conference on Programming Language Design and Implementation, pp. 142-151, 1998.

Markovskiy, Y. Range analysis with Abstract Interpretation, pp. 1-8, 2002.

Gautam, R.K. Bit-width analysis, pp. 1-30, Mar. 20, 2009.

Stephenson, et al. Bitwise Compilation. http://www.cag.lcs.mit.edu/bitwise/ downloaded May 27, 2008.

* cited by examiner

FIG. 1

```
L1:    x = 2³² − 1         // REQUIRES 32 BITS.
       ...                  // x REQUIRES 32 BITS HERE.
L2:    y = x& 0xFFFF        // x REQUIRES ONLY 16 BITS.
       ...
L3:    z = x& 0xFF          // x REQUIRES 8 BITS.
```

FIG. 2

$L_1: v = 2^{32} - 1;$            $LL_1 : v_1 = 2^{32} - 1;$
$L_2:$ print $v;$                  $LL_2 :$ print $v_1;$
...                                $LL_3 : v_2 = \Psi(v_1, 32, 0, 15)$
$L_n: x = v$ & 0xFFFF;             ...
                                   $LL_n : x = v_2$ & 0xFFFF;

```
1   function Rename-vars
2   foreach n ∈ Nodes, v ∈ Use(n) do
3   |   replace the variable v at node n, with $v_i$, where i is
    |   fresh;
4   end 5   function Build-W-dominators
6   foreach $v_t$ ∈ wssaVars do
7   |   ∀v ∈ Vars, $n_1$ ∈ Nodes, WDom($n_1$, $v_1$) = {($n_2$, $v_2$)
    |   $v_1$ ∈ Use($n_1$) ∧ $v_2$ ∈ Use($n_2$)∧
8   |   $n_1$ ∈ Dom($n_2$) ∧ R($v_1$, $n_1$) ⊆ R($v_2$, $n_2$)∧
9   |   (E$n_3$ ∈ Nodes, $v_3$ is a W-SSA variable of v:
    |   ($n_3$, $v_3$) ∈ WDom($n_1$, $v_1$) ∧ ($n_2$, $v_2$) ∈ WDom($n_3$, $v_3$))
    |   };
10  end 11  function Insert-Psi-nodes
12  foreach $n_1$ ∈ Nodes do
13  |   if ($n_2$, $v_2$) ∈ WDom($n_1$, $v_1$) then
14  |   |   Let R($v_1$) = ($ll_1$, $ul_1$);
15  |   |   Let R($v_2$) = ($ll_2$, $ul_2$);
16  |   |   insert $v_2$ = Ψ($v_1$, $ul_1$ − $ll_1$ + 1, $ll_2$, $ul_2$) after $n_1$;
17  |   end
18  end
```

FIG. 6

```
1   Sort the set V in the decreasing order of the sizes of the
    variables and store it in a queue Q;
2   Out = empty set;
3   v' = create a new packing variable;
4   used = 0; Avail(v') = maxSize;
5   while Q.size() ≠ 0 do
6   |   v = Q.remove();
7   |   v → (v', used, used + Size(v) - 1);
8   |   used = used + Size(v);
9   |   Avail(v') -= Size(v);
10  |   Assert(Avail(v') ≥ 0); // See Lemma 3.2
11  |   if Avail (v') == 0 then
12  |   |   Out.add(v');
13  |   |   v' = create a new packing variable;
14  |   |   used = 0; Avail(v') = maxSize;
15  |   end
16  end
17  if Avail (v') ≠ Size(v') then
18  |   Out.add (v');
19  end
20  return Out;
```

FIG. 7

1. $Q = \{ (v_9, 32), (v_8, 8),$
   $(v_{10}, 8), (v_3, 4), (v_6, 4),$
   $(v_2, 2) (v_7, 2), (v_4, 2),$
   $(v_5, 1), (v_1, 1) \}$
2. $v' = p_1$ = create new variable.
3. $v_9 \rightarrow (p_1, 0, 31)$
4. $Avail(v') = 0$
5. $Out = \{p_1\}$
6. $v' = v_2$ = create new variable.
7. $v_8 \rightarrow (p_2, 0, 7)$
8. $Avail(v_2) = 24$
9. $v_{10} \rightarrow (p_2, 8, 15)$
10. $Avail(r_2) = 16$
11. $v_3 \rightarrow (p_2, 16, 19)$
12. $Avail(v_2) = 12$
13. $v_6 \rightarrow (p_2, 20, 23)$
14. $Avail(v_2) = 8$
15. $v_2 \rightarrow (p_2, 24, 25)$
16. $Avail(v_2) = 6$
17. $v_7 \rightarrow (p_2, 26, 27)$
18. $Avail(v_2) = 4$
19. $v_4 \rightarrow (p_2, 28, 29)$
20. $Avail(v_2) = 2$
21. $v_5 \rightarrow (p_2, 30, 30)$
22. $Avail(v_2) = 1$
23. $v_1 \rightarrow (p_2, 31, 31)$
24. $Avail(v_2) = 0$
25. $Out = \{p_1, p_2\}$
26. return $Out$

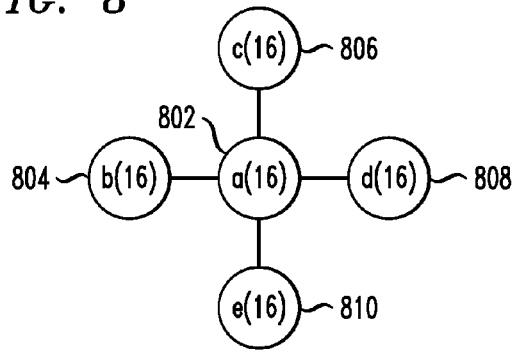

FIG. 8

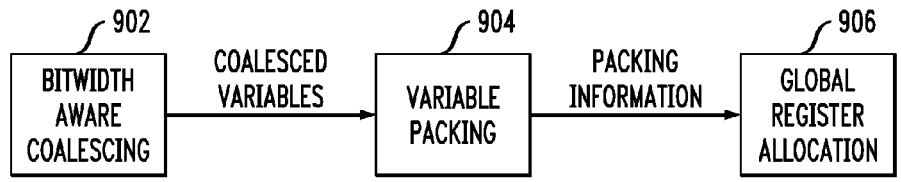

```
1   function SafelyAggressiveCoalesce
2       ∀vᵢ ∈ V  C(vᵢ) = {v}; // Initalization
3       Say the max size of any variable be k = 2ʳ;
4       foreach i = 0; i < r; i = i + 1 do
5       │   BucketCoalesce(i);
6       │   PackBucket(i);
7       end
8       BucketCoalesce(r);

9   function BucketCoalesce(i)
    // Aggressively coalesce in bucket i.
10      Worklist w = SelectList(V, i);
11      while ¬w.empty() do
12      │   v = w.remove() ; // Removes one element.
13      │   if ∃u ∈ w ∧ (u, v) ∉ Interf then
            │   // Remove u, v. Add a coalesced
            │       variable.
14      │   │   w.remove(v);w.remove(u) ;
15      │   │   V.remove(v);V.remove(u) ;
16      │   │   x = create a new var;
17      │   │   w.add(x);V.add(x);
18      │   │   C(x) = C(v) ∪ C(u);
19      │   │   UpdateInterference(v, x);
20      │   │   UpdateInterference(u, x);
21      │   end
22      end 23  function PackBucket(i)
    // Pack interfering variables with size 2ⁱ to
        variable of size 2ⁱ⁺¹
24      Worklist w = SelectList(V, i);
25      foreach ¬w.empty() do
26      │   v = w.remove() ; // Removes one element.
27      │   if ∃u ∈ w ∧ C(v) ∩ C(u) == {} then
28      │   │   Assert(v, u) ∈ Interf;
29      │   │   w.remove(u);
30      │   │   x = create a new var of size 2ⁱ⁺¹;
31      │   │   V.add(x);
32      │   │   C(x) = C(v) ∪ C(u);
33      │   │   UpdateInterference(v, x);
34      │   │   UpdateInterference(u, x);
35      │   end
36      end 37  function UpdateInterference(v, x)
38      foreach (v, u) ∈ Interf do
39      │   Interf = Interf − {(v, u), (u, v)};
40      │   Interf = Interf ∪ {(x, u), (u, x)};
41      end
```

| BENCHMARK | #SOURCE LINES |
|---|---|
| adpcm | 195 |
| bilint | 121 |
| bubblesort | 68 |
| convolve | 80 |
| edge_detect | 181 |
| histogram | 109 |
| jacobi | 67 |
| levdurb | 52 |
| life | 148 |
| median | 98 |
| motiontest | 44 |
| mpegcorr | 130 |
| newlife | 120 |

FIG. 12

| BENCHMARK | # ORIGINAL PSEUDO VARS | EXEMPLARY EXISTING APPROACH | | #W-SSA VARS | EXEMPLARY EMBODIMENT OF THE INVENTION | | | | OVERALL IMPROVEMENTS | | 1202 |
|---|---|---|---|---|---|---|---|---|---|---|---|
| | | # VARS AFTER PACKING | % REDUCTION OVER ORIGINAL | | #VARS AFTER OPTIMAL PACKING | % REDUCTION OVER W-SSA | #VARS AFTER COALESCING + PACKING | % REDUCTION OVER W-SSA | % REDUCTION OVER ORIGINAL | % REDUCTION OVER [23] | |
| adpcm | 17 | 14 | 17.64 | 19 | 10 | 47.36 | 3 | 84.21 | 82.35 | 78.57 | |
| bilint | 97 | 97 | 0 | 97 | 51 | 47.42 | 2 | 97.93 | 97.93 | 97.93 | |
| bubblesort | 21 | 17 | 19.04 | 23 | 15 | 34.78 | 3 | 86.95 | 85.71 | 82.35 | |
| convolve | 8 | 8 | 0 | 10 | 8 | 20.00 | 3 | 70.00 | 62.50 | 62.50 | |
| edge_detect | 63 | 63 | 0 | 71 | 65 | 8.45 | 4 | 94.36 | 93.65 | 93.65 | |
| histogram | 28 | 26 | 7.14 | 30 | 23 | 23.33 | 3 | 90.00 | 89.28 | 88.46 | |
| jacobi | 36 | 36 | 0 | 38 | 37 | 2.63 | 3 | 92.10 | 91.66 | 91.66 | |
| levdurb | 19 | 19 | 0 | 19 | 17 | 10.52 | 3 | 84.21 | 84.21 | 84.21 | |
| life | 77 | 77 | 0 | 87 | 78 | 10.34 | 3 | 96.55 | 96.10 | 96.10 | |
| median | 12 | 12 | 0 | 14 | 12 | 14.28 | 3 | 78.57 | 75.00 | 75.00 | |
| motiontest | 4 | 4 | 0 | 4 | 4 | 0 | 2 | 50.00 | 50.00 | 50.00 | |
| mpegcorr | 52 | 46 | 11.53 | 54 | 36 | 33.33 | 3 | 94.44 | 94.23 | 93.47 | |
| newlife | 68 | 60 | 11.76 | 76 | 67 | 11.84 | 3 | 96.05 | 95.58 | 95.00 | |

FIG. 13

| BENCHMARK | # ORIGINAL PSEUDO VARS | EXEMPLARY EXISTING APPROACH | | #W-SSA VARS | EXEMPLARY EMBODIMENT OF THE INVENTION | | | | OVERALL IMPROVEMENTS | |
|---|---|---|---|---|---|---|---|---|---|---|
| | | # VARS AFTER PACKING | % REDUCTION OVER ORIGINAL | | #VARS AFTER OPTIMAL PACKING | % REDUCTION OVER W-SSA | #VARS AFTER COALESCING + PACKING | % REDUCTION OVER W-SSA | % REDUCTION OVER ORIGINAL | % REDUCTION OVER [23] |
| adpcm | 24 | 14 | 41.66 | 56 | 29 | 48.21 | 11 | 80.35 | 54.16 | 21.42 |
| bilint | 37 | 14 | 62.16 | 71 | 36 | 49.29 | 13 | 81.69 | 64.86 | 7.14 |
| bubblesort | 13 | 11 | 15.38 | 23 | 13 | 43.47 | 5 | 78.26 | 61.53 | 54.54 |
| convolve | 7 | 7 | 0 | 14 | 8 | 42.85 | 3 | 78.57 | 57.14 | 57.14 |
| edge_detect | 23 | 22 | 4.34 | 43 | 26 | 39.53 | 9 | 79.06 | 60.86 | 59.09 |
| histogram | 20 | 18 | 10.00 | 36 | 20 | 44.44 | 5 | 86.11 | 75.00 | 72.22 |
| jacobi | 19 | 15 | 21.05 | 42 | 32 | 23.80 | 4 | 90.47 | 78.94 | 73.33 |
| levdurb | 22 | 22 | 0 | 45 | 33 | 26.66 | 7 | 84.44 | 68.18 | 68.18 |
| life | 25 | 25 | 0 | 46 | 27 | 41.30 | 6 | 86.95 | 76.00 | 76.00 |
| median | 12 | 12 | 0 | 25 | 17 | 32.00 | 6 | 76.00 | 50.00 | 50.00 |
| motiontest | 4 | 4 | 0 | 8 | 5 | 37.50 | 4 | 50.00 | 0 | 0 |
| mpegcorr | 16 | 15 | 6.25 | 30 | 19 | 36.66 | 5 | 83.33 | 68.75 | 66.66 |
| newlife | 26 | 23 | 11.53 | 47 | 31 | 34.04 | 6 | 87.23 | 76.92 | 73.91 |

INTERMEDIATE FORM FOR BITWIDTH SENSITIVE APPLICATIONS AND USES THEREOF

FIELD OF THE INVENTION

Embodiments of the invention generally relate to information technology, and, more particularly, to register allocation.

BACKGROUND OF THE INVENTION

Register allocation is the process of assigning hardware registers to variables and spilling those variables that can not be assigned a register. Innovation in computer architecture domain has resulted in challenges for register allocation. For example, applications from embedded architecture domain (network, multimedia and speech processing) extensively use narrow width data via packing and unpacking. A typical embedded application program may include unpacking packed input data items for further processing and accumulating temporary results in packed form for output processing.

Bitwidth-aware register allocation includes computing bitwidth information for variables at various program points using bit-section analysis and then pack narrow width variables before invoking a traditional register allocation algorithm. Bitwidth aware register allocation includes a variable packing algorithm, which packs multiple small sized variables into one single variable. Existing approaches to bin-packing problems, however, are slow and imprecise.

SUMMARY OF THE INVENTION

Principles and embodiments of the invention provide techniques for an intermediate form for bit-width sensitive applications and uses thereof.

An exemplary method (which may be computer-implemented) for representing a program, according to one aspect of the invention, can include steps of creating one or more sub-variables for each of one or more variables in the program, and maintaining a single size of each of the one or more variables throughout a life-span of each of the one or more variables.

Additionally, an exemplary method (which may be computer-implemented) for performing register allocation, according to one aspect of the invention, can include steps of representing bit-width information of each of one or more variables in a powers-of-two representation, wherein the one or more variables comprise one or more variables in a program, coalescing the one or more variables, packing the one or more coalesced variables, and using the one or more packed variables to perform register allocation.

Also, an exemplary method (which may be computer-implemented) for packing one or more variables of a program within a compiler are provided that can include expressing each width of the one or more variables in a representation wherein a size of each variable is a power of two, and using a greedy approach to pack the one or more variables.

One or more embodiments of the invention or elements thereof can be implemented in the form of a computer product including a computer usable medium with computer usable program code for performing the method steps indicated. Furthermore, one or more embodiments of the invention or elements thereof can be implemented in the form of an apparatus or system including a memory and at least one processor that is coupled to the memory and operative to perform exemplary method steps. Yet further, in another aspect, one or more embodiments of the invention or elements thereof can be implemented in the form of means for carrying out one or more of the method steps described herein; the means can include hardware module(s), software module(s), or a combination of hardware and software modules.

These and other objects, features and advantages of the present invention will become apparent from the following detailed description of illustrative embodiments thereof, which is to be read in connection with the accompanying drawings.

BRIEF DESCRIPTION OF THE DRAWINGS

FIG. 1 is a diagram illustrating different sections of the variables used during different program segments, according to an embodiment of the present invention;

FIG. 2 is a diagram illustrating an original program and its corresponding as width-single static assignment (W-SSA) form, according to an embodiment of the present invention;

FIG. 3 is a diagram illustrating transforming a program to W-SSA form, according to an embodiment of the present invention;

FIG. 6 is a diagram illustrating an optimal variable packing algorithm, according to an embodiment of the present invention;

FIG. 7 is a diagram illustrating a trace of an optimal variable packing algorithm, according to an embodiment of the present invention;

FIG. 8 is a diagram illustrating exemplary impact of coalescing on variable packing, according to an embodiment of the present invention;

FIG. 9 is a diagram illustrating bitwidth register allocation with coalescing, according to an embodiment of the present invention;

FIG. 10 is a diagram illustrating an exemplary coalescing algorithm, according to an embodiment of the present invention;

FIG. 11 is a diagram illustrating a chart depicting benchmark line numbers, according to an embodiment of the present invention;

FIG. 12 is a diagram illustrating a table depicting a comparison of packing and coalescing algorithms, according to an embodiment of the present invention;

FIG. 13 is a diagram illustrating a table depicting a comparison of packing and coalescing algorithms, according to an embodiment of the present invention;

DETAILED DESCRIPTION OF EMBODIMENTS

Figure 4:
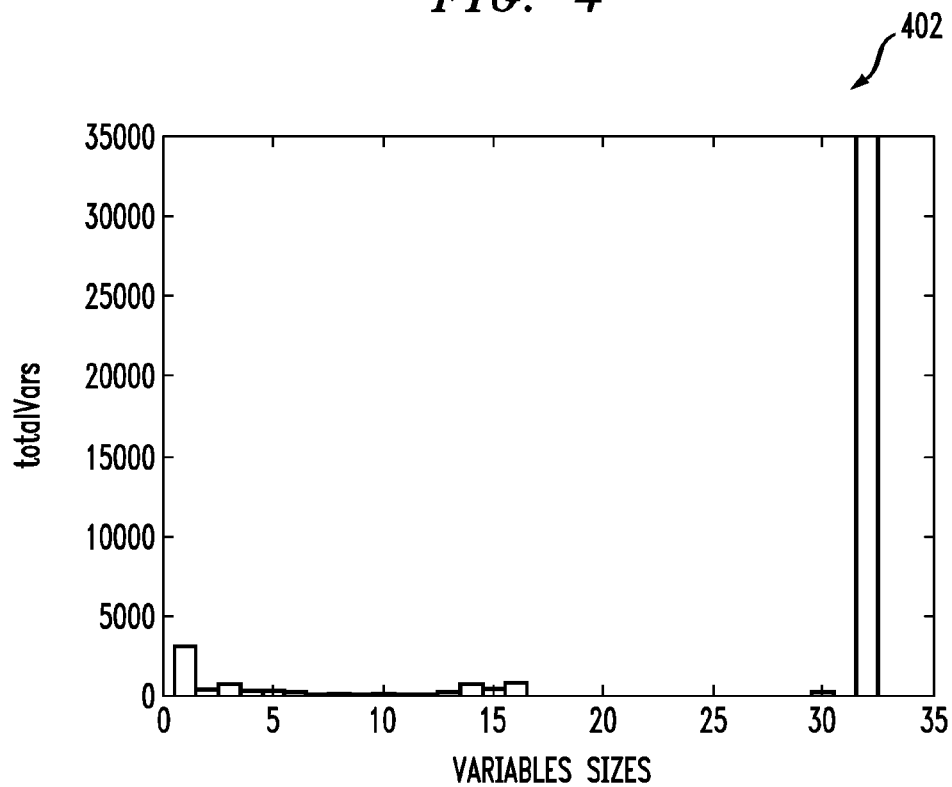
FIG. 4 is a diagram illustrating a graph depicting width distribution in a BITWISE benchmark set, according to an embodiment of the present invention.

Principles of the invention include an intermediate form for bitwidth sensitive applications, referred to herein as width-single static assignment (W-SSA). One or more embodiments of the invention can be used, for example, to perform variable packing.

As noted above, existing approaches that include a program being in single static assignment (SSA) form is not sufficient. A program in SSA form has a property that the value of a SSA variable does not change during its life time. However, programs that deal with different bit sections of variables may require different sections of the variables during different program segments. Even though a variable might not be defined at multiple places, the bit sections of the variable that are referred at different program points might vary. For example, consider the program shown in FIG. 1.

FIG. 1 is a diagram illustrating different sections of the variables 102 used during different program segments, according to an embodiment of the present invention. Even though the program is in SSA form (the variable x is defined at only one place), at different program points it requires different sections from the full set of 32 bits. That is, unlike the declared size, the actual size of the variable x is different at different program points. As such, one or more embodiments of the invention include a program representation referred to herein as W-SSA form. A program in W-SSA form guarantees that every variable is defined exactly once, and the actual size of any variable remains unchanged throughout its life-time. Also, programs in W-SSA form can enable powerful analysis.

Actual width of a variable is defined as the set of bits of a variable that are actually required for its use or definition at a program point. Note that width is referred to herein as the actual bit positions of the bit section of a variable, as opposed to the size, which represents the number of bits in the width representation. For example, in FIG. 1, the actual width of x at label L1 is (0,32), the actual width of x at L2 is (0,16) and at L3 is (0,8). Similarly, actual sizes of x are 32, 16 and 8 at L1, L2 and L3, respectively.

As described herein, an experimental study was performed to determine if the representation of the bitwidth information for variables has any impact on the packing algorithm. The experiment studied the distribution of various sizes of various variables in a program. The sizes of various variables at various program points were obtained after running a bit-section analysis (BSA). The majority of the variables had patterns with respect to their sizes, with the sizes of variables clustered around a number close to the form $2^i$, for different non-negative integer values of i. This indicates that even if one restricts different possible sizes of variables to be powers-of-two, one will be on target for most of the variables.

Such a representation would result in wastage of some bits, and one can pad each non-power-of-two-sized-variable with a few extra bits to expand the size to the nearest number that is a power of two. The experimental results illustrate that the resulting wastage from such a scheme is a small fraction (less than 1%) of the total number of bits required. As such, one or more embodiments of the invention include a representation referred to herein as the powers-of-two representation, which can be leveraged to perform better packing of variables.

As described herein, one or more embodiments of the invention include a form of static-single-assignment (SSA) referred to as width-SSA (W-SSA). A program in W-SSA form has an additional property compared to the program in SSA form, in that every use of a W-SSA variable has only one definition and unique size. Additionally, a program in W-SSA form can be transformed into W-SSA form quickly.

Additionally, the techniques described herein include allocating a required number of bits to a variable in an intermediate form of representation during compilation, as well as allocating different bit width for multiple occurrence of a variable. One or more embodiments of the invention also include allocating a minimum bit width to variables.

For programs in W-SSA form, one can overcome the hardness of the variable packing algorithm and provide an optimal solution. As detailed herein, variable coalescing is a significant aspect of variable packing in bitwidth-aware register allocation domain. The techniques described herein illustrate that the presence of a bitwidth-aware coalescing scheme affects a bit packing algorithm positively.

One or more embodiments of the invention include a heuristic-based bitwidth aware coalescing that acts as a pre-pass to variable packing. In existing approaches, heuristic-based coalescing approaches have a drawback in that, at times, the coalescing might deteriorate the target optimization (for example, coalescing can negatively affect register allocation). However, for programs in W-SSA form, one or more embodiments of the invention do not increase the bit pressure of a program at any program point pc, as compared to the bit pressure at pc as detected by an optimal packing algorithm.

Bit pressure at any program point is defined as the number of bits required by the program to hold all the live variables at that program point. As detailed herein, one or more embodiments of the invention reconfirm that coalescing is a significant pre-pass for variable packing, and the heuristic-based approach described herein results in good improvements in variable packing.

Also, one or more embodiments of the invention include transforming a program in SSA form to W-SSA form. The W-SSA-form can be used, for example, for programs concerned over the bit level usage of bits. The techniques detailed herein also include an optimal packing algorithm for variables in W-SSA transformed programs (these variables are referred to herein as W-SSA variables), and one can use the restriction that the W-SSA variables are in powers-of-two representation. Further, one or more embodiments of the invention include an aggressive coalescing algorithm of W-SSA variables that are represented in powers-of-two representation, wherein the presence of the coalescing phase does not deteriorate the bit packing.

By way of example, a program in SSA form may not be in W-SSA form. In SSA form, the width of a variable is same as the width of the statically declared type of the variable. However, in W-SSA form, one takes into consideration the actual width needed by the variable at a program point. This is significant because statically declared width of a variable is not useful in the context of a bitwidth-aware program analysis and optimization. For example, an integer variable that is defined to be using 32 bits may end up using much less than 32 bits at various program points. Actual width of variables at various program points can be computed, for example, using static bit-section analysis algorithms or dynamic profiling of the program variables.

FIG. 2 is a diagram illustrating an original program and its corresponding W-SSA form 202, according to an embodiment of the present invention. The code fragment in FIG. 2(a) is in SSA form. The variable v requires 32 bits at $L_1$ and $L_2$; however, after $L_2$, one needs only 16 bits of v. This is not captured in the original SSA form. FIG. 2(b) depicts an equivalent program in W-SSA form. Two variables $v_1$ (requires 32 bits) and $v_2$ (requires 16 bits) are used to represent the original variable v. The narrow width of v after $LL_2$ is captured using a select function $\Psi$ that takes four arguments: the source variable name ($v_1$), the declared width of the source variable (32), starting bit position (0) and the ending bit position (15).

The function $\Psi$ returns the required selection. Note that the width of $v_1$ is 32 bits across its lifetime, including $LL_3$, and the width of $v_2$ is 16 bits. It can also be seen that the statement $LL_n$ can be optimized away by a copy statement: $x=v_2$. This optimization can be done, for example, by iterating over the program and replacing all expressions of the form v&s with its corresponding W-SSA variable.

W-SSA assigns a new temporary for every assignment. Actual width of a variable may change at program points other than assignment statements. For example, in FIG. 2(a), v needs 16 bits from $L_2$ to $L_n$ without any intervening assignment statement. The actual width of a variable not only changes by an assignment but also based on the use of the variable. If the actual width of a variable changes at a certain program point, then one can create a new W-SSA variable to reflect the modified width.

In a program in W-SSA form, every variable has an associated width, and this width is unique throughout the lifetime of the variable. One can use the set "Vars" to denote the set of SSA variables in the program and "Nodes" to denote the set of nodes (statements) in the program. Also, one can use a utility map, Use: Nodes→P(Vars), that returns the set of variables used in node n. One or more embodiments of the invention also use a map $\Re$ : (Vars×Nodes)→(Int×Int).

For each definition and use of a variable v at node n, $\Re$ (v, n) returns a range pair (ll, ul) that denotes the lower and upper bit positions actually required with respect to the declared bit representation. Note that the actual size of the variable v at node n with $\Re$ (v, n)=(ll, ul) is ul−ll+1. For example, in FIG. 2(a), $\Re$ (v, $L_n$)=(0, 15) and the actual size of v at $L_n$ is 16 bits. Given two range pairs $r_1=(ll_1, ul_1)$ and $r_2=(ll_2, ul_2)$, one can conclude that $r_1 \subseteq r_2$ iff $(ll_2 \leq ll_1) \wedge (ul_1 \leq ul_2)$.

FIG. 3 is a diagram illustrating transforming a program to W-SSA form 302, according to an embodiment of the present invention. By way of illustration, FIG. 3 depicts transforming a given program in SSA form to W-SSA form. One or more embodiments of the invention can include splitting the live ranges of the SSA variables such that each live range corresponds to the live range of exactly one variable with unique actual width, and inserting $\Psi$ nodes.

One can create new variables by breaking the live ranges of existing variables such that each variable has a unique actual width through out its lifetime. In FIG. 3, lines 2-4 replace each use of a variable v with a new name (variable) $v_i$. These variables are also referred to herein as W-SSA variables. The variable v is denoted as the root variable of $v_i$. One can use different literals, for example, u, v, and w, to denote different SSA variables. As illustrated herein, one can use $v_1, v_2 \ldots v_i$ to denote the W-SSA variables of v. It may be noted that replacing every use of a variable with a new name can result in a large number of W-SSA variables. As such, in one or more embodiments of the invention, one can add a new name for each distinct use of a variable.

Also, once the variables are renamed, these variables need to be defined. A W-SSA variable $v_2$ that is used at a control flow node $n_2$, is defined immediately following each of its w-dominators (width dominators). With respect to a variable v having $v_1$ and $v_2$ as two W-SSA variables, node $n_1$ is a w-dominator of $n_2$ (denoted by $(n_2, v_2) \in$ WDom$(n_1; v_1)$), iff node $n_1$ and $n_2$ use W-SSA variables $v_1$ and $v_2$, respectively, $n_1$ control dominates $n_2$, $\Re(v_2, n_2) \subseteq \Re(v_1, n_1)$ and $\nexists n_3 \in$ Nodes, and $v_3$ a W-SSA variable of v: $(n_3, v_3) \in$ WDom $(n_1, v_1) \wedge (n_2, v_2) \in$ WDom$(n_3, v_3)$.

In FIG. 3, lines 6-10 denote the w-dominator for each control flow node and W-SSA variable pair. The map Dom ($n_2$) provides the set including the control dominators of $n_2$. Lines 12-18 insert $\Psi$ nodes at relevant places. If ($n_1$, $v_1$) w-dominates ($n_2$, $v_2$), then one can insert a $\Psi$ node after $n_1$. It may be noted that if the source $v_1$ and destination $v_2$ both refer to the same set of bits of variable v, then the select operator $\Psi$ behaves like a copy operation. All of these redundant copy instructions can be optimized away by a subsequent pass of copy propagation. Note that $\Psi$ nodes are not inserted at the iterated dominance frontiers, unlike the insertion of $\phi$ nodes in SSA. However, from the point of last use (say it uses 32 bits) until the iterated dominance frontier (say it requires 16 bits), one will be wasting the extra bits (16). That is a reason why this is an eager placement, unlike the semi-eager placement in the case of SSA.

In one or more embodiments of the invention, as shown, for example, in FIG. 3, one can create new variables, initialize them and use them. As described herein, to preserve the SSA form, the algorithm must guarantee that every variable is defined only once. Also, the create, initialize, and use operations should not violate the data flow semantics of the original program.

By way of example, one can insert an initialization operation only in function Insert-$\Psi$-nodes, by inserting a $\Psi$ node. For a node, variable pair ($n_2$, $v_2$), one can insert a $v_2=\Psi(\ldots)$ statement after every dominator of $v_2$. Because the input program is already in SSA form, each program node n, with respect to a variable v, will have exactly one dominator. Hence, any W-SSA variable will be defined only once. Additionally, because every W-SSA variable has exactly one dominator, and one can select the bits relevant to the use of that variable, the original data flow semantics are preserved.

In one or more embodiments of the invention, the functions Rename-vars and Insert-$\Psi$-nodes have complexity linear in the number of nodes. Also, even though the Build-W-dominators function seems to iterate over all the variables at each node, in reality, it needs to do so for only those variables that are used at that program point. For a program in 3-address code, this will be a constant. Further, knowledge of this point makes the complexity of the algorithm quadratic in the number of nodes.

As also described herein, one or more embodiments of the invention include computing utility maps. For example, $\Re$ can represent complexity of bit-section analysis (BSA): O(n). Also, Dom can represent complexity of computing dominators O(n). Consequently, the overall complexity can be expressed as $O(n^2)$.

By way of example, for the example shown in FIG. 2, below is presented the different sets, maps and instructions generated.

| | |
|---|---|
| Nodes = {L$_1$, L$_2$, L$_3$} | Vars = {v} |
| wssaVars = {v$_1$, v$_2$} | Use(L$_1$) = {v$_1$} |
| Use(L$_1$) = {v$_1$} | Use(L$_n$) = {v$_2$} |
| Dom(L$_2$) = {L$_1$} | Dom(L$_n$) = {L$_1$, L$_2$} |
| $\Re$(v$_1$) = (0, 32) | $\Re$(v$_2$) = (0, 16) |
| WDom(L$_n$, v$_2$) = {(L$_2$, v$_1$)} | insert v$_2$ = Ψ(v$_1$, 32, 0, 15). |

In one or more embodiments of the invention, code generation for programs in W-SSA form would need to translate away the Ψ nodes. And if the input program is in SSA form, it is desirable that after translating out the Ψ nodes that the code still remains in SSA form. After the code is translated back to SSA form, the sizes of all of the variables will be the same as their declared size. A typical (un-optimized) translation of a Ψ operation is given using a sequence of bitwise operations can include, for example, $$v_2 = \psi(v_1, s, ll, ul) \Longrightarrow \frac{v_3 = v_1 \ll s - ul}{v_2 = v_3 \gg ul + ll},$$

where >> and << represent the shift-right and shift-left operators, respectively.

As described herein, principles of the invention also include application of W-SSA form for bitwidth aware variable packing. One or more embodiments of the invention include representing bitwidth information (referred to herein as powers-of-two representation) and illustrating that for programs in W-SSA form, bitwidth aware variable packing can be solved optimally in linear time. Also, one or more embodiments of the invention include a heuristic-based solution to the problem of coalescing in the context of variable packing. The techniques described herein can be implemented as a pre-pass to variable packing. Additionally, for programs in W-SSA form, heuristic-based coalescing does not deteriorate the variable packing phase.

By way of example, one or more embodiments of the invention can include applications of W-SSA form such as bitwidth aware variable packing and bitwidth aware variable coalescing. The techniques detailed herein can also include an optimal variable packing algorithm as well as a heuristic based safely-aggressive coalescing algorithm. And as noted above, one or more embodiments of the invention include a bitwidth representation referred to herein as powers-of-two representation. The overhead associated with the representation is minimal and the implication on the bit packing algorithm is worthy.

Bitwidth aware register allocation includes the reduction of the number of pseudos spilled into memory (thus improving the execution time performance) and reduction in required memory (helping in compilation of programs targeted to systems with constrained memory). As noted herein, a main component of this allocation is the variable packing algorithm, which packs multiple small sized variables into one single variable. In contrast to the existing approaches to different bin-packing problems, which are too slow and/or not precise, the techniques described herein include a fast algorithm to do variable packing.

In some existing approaches, heuristic-based coalescing solutions have a drawback that, at times, the coalescing might deteriorate the target optimization (for example, coalescing can negatively affect register allocation). However, for programs in W-SSA form, one or more embodiments of the invention does not increase the bit pressure of a program at any program point pc, as compared to the bit pressure at pc as detected by an optimal packing algorithm.

FIG. 4 is a diagram illustrating a graph 402 depicting width distribution in a BITWISE benchmark set, according to an embodiment of the present invention. FIG. 4 depicts the distribution of the actual sizes of variables in a BITWISE benchmark set using a bit-section analysis. A BITWISE benchmark set is a representative set of programs for applications in embedded systems domain. The actual size of a variable differs from its declared size and can be much smaller. Actual size of a variable is program point specific, as opposed to declared size which is unique throughout the program. For example, a variable that is declared as an int has a declared size to be 32 bits, and if it is used as a Boolean at a program point, then its actual size is 1 bit.

The actual sizes of various variables can be computed, for example, using bit-section analysis (BSA). By way of example, each variable in the benchmark programs described herein can have actual sizes between 1-32 bits. For each possible size s, one can calculate the number of s sized variables live at any program point in all the benchmark programs under consideration as totalV ars(s)=$\Sigma_{b \in B} \Sigma_{p \in V(b)} \Sigma_{v \in V(b)}$ hasSize(b,p,v,s), where B is the set of benchmark programs, P(b) returns the set of program points in b, V (b) gives the set of variables in benchmark b, and the map hasSize(b, p, v, s) returns 1, if variable v has actual size of s at program point p in benchmark b. FIG. 4 depicts the plotting of the totalV ars against the variable sizes (1-32).

As illustrated in FIG. 4, most of the variables are of 32 bit size, which can be due to the limitations of static analysis. Also, note that the distribution of sizes is clustered around numbers which are powers of two. This observation can be leveraged to represent the sizes as powers-of-two instead of the actual size. Such a representation can result in the wastage of few extra bits due to the fact that one can pad each non-power-of-two-sized-variable with a few bits to expand the size to the next number that is a power of two. In connection with FIG. 4, the resulting wastage was calculated and found to be 0.68% across all the programs in BITWISE benchmark set. Wastage can be computed as a percentage of extra bits required over the total number of bits. As an exemplary comparison, for the same set of benchmark programs, the resulting wastage was found to be 25.6% when the declared sizes (32 bits) of variables was used instead of their computed actual sizes.

Figure 5:
FIG. 5 is a diagram illustrating exemplary bitwidth aware register allocator, according to an embodiment of the present invention.

FIG. 5 is a diagram illustrating exemplary bitwidth aware register allocator, according to an embodiment of the present invention. By way of illustration, FIG. 5 depicts a variable packing component 502, which sends packing information to a global register allocation component 504.

FIG. 6 is a diagram illustrating an optimal variable packing algorithm 602, according to an embodiment of the present invention. FIG. 6 depicts an exemplary existing bitwidth aware register allocation scheme. A pre-pass of variable packing determines the sizes of individual variables and packs the variables iteratively, which is followed with an invocation of global register allocation that does the actual allocation.

Under a set of constraints, the techniques described herein can perform optimal bitwidth aware variable packing in polynomial time. That is, given a set of variables, and their actual sizes, one or more embodiments of the invention can predict the optimal packing for them. In particular, the techniques detailed herein address, in polynomial time, the question that, given a set V of variables, an integer constant $k_1 < |V|$, and another integer constant $k_2$, does there exist a variable packing that can pack variables of V in $k_1$ number of variables such that size of each new variable is bounded by $k_2$?

A set of constraints can be used to help perform optimal bitwidth aware variable packing in polynomial time. For example, the program can be in W-SSA form (that is, every variable has a unique actual width throughout the program). Also, an exemplary constraint can include $k_2=2^r$, r 0. This constant, $k_2$, is typically the size of a hardware register. All of the registers in real architectures have sizes that are powers of two only; hence, this constraint would not impact the variable packing problem. Additionally, another constraint can include the size of any W-SSA variable is in the set $\{2^i | 0 \leq i \leq r\}$. As detailed herein, a majority of inferred actual sizes of variables are in the set $\{2^i | 0 \leq i \leq 5\}$ and does not lead to significant bit-wastage.

Under the above mentioned exemplary constraints, given a set, V, of W-SSA variables, the following greedy algorithm results in the optimal variable packing. Such an algorithm takes a set of variables and outputs a set Out containing the packing variables. One can assume that the Size(v) map returns the actual size of the W-SSA variable v and Avail(v') map returns the number of available bits in the current packing variable. One or more embodiments of the invention starts with a list of variables sorted in the decreasing order of their sizes and greedily packs them into the current packing variable. The set Out is populated every time a packing variable gets full or when one opts to break out of the while loop. As detailed herein, the complexity of the algorithm is bound by the complexity of sorting the set V and hence O(n log n).

By way of example, assume a set of variables and their sizes as given below: $\{(v_1, 1), (v_2, 2), (v_3, 4), (v_4, 2), (v_5, 1), (v_6, 4), (v_7, 2), (v_8, 8), (v_9, 32), (v_{10}, 8)\}$. As such, FIG. 7 is a diagram illustrating a trace of an optimal variable packing algorithm 702, according to an embodiment of the present invention.

With respect to packing the variables in sequence, a disadvantageous strategy would lead to holes. For example, assume from some sequence of input variables, one filled in 32 bit packing variables in the following order: 16 bits, 8 bits, 16 bits, 8 bits, and 16 bits. The first pair will be placed in the first packing variable, the second pair in the second, and the last one would need a third packing variable. The first two packing variables have left 8+8=16 bits of (hole) free space, which could not be used for the last variable whose size was 16 bits. As such, one or more embodiments of the invention include an optimal scheme in which there will never be any holes/free bits (except at most in one packing variable, the current one), and can be performed in polynomial time.

By way of example, if one has $2^k$ bits available in a register and assigns $2^j$ bits at a time, for any one specific value of j≤k, then after m such assignments, if free bits are available, the number of free bits is a multiple of $2^j$. In other words, the following formula will hold: $(2^k-(m+1)\times 2^j) \mod 2^j=0$. Because k≥j, $2^k/2^j=2\times n$, for some value of n. As such, $(2^k-(m+1)\times 2^j) \mod 2^j=(2^k \mod 2^j - m\times 2^j \mod 2^j) \mod 2^j=0 \mod 2^j=0$.

Also, at the end of each iteration, the number of available non-zero bits in the current register (r) would be sufficient to pack the next variable. Assume in iteration n, one processed a variable whose size is $2^j$. One would have two sub cases:

Size of next variable is $2^j$: From Lemma 3.1, we Avail(r) ¿ $2^j$; and

If size of next variable is $2^l$, 1<j: From Lemma 3.1, $(2^k-(m+1)\times 2^j) \mod 2^j=0 \Rightarrow (2^k-(m+1)\times 2^j) \mod 2^l=0$.

Additionally, the optimal packing algorithm illustrated in FIG. 3 will generate at most one packing variable with a hole. One will have holes only if during any iteration at line 9, one will have a non-negative value for Avail(r). One can conclude that if the number of available bits in the current packing variable is non-zero, then one will always have enough bits to pack the next variable. Also, the if-statement at line 11 ensures that one will never have a current packing register with zero available bits.

As noted herein, in one or more embodiments of the invention, one will not have any holes in the packing variables, except possibly in the current one, and there will not be any other free bits left in the used-up packing variables. If the number of packing variables used in one or more embodiments of the invention to pack the given set L of variables is more than one packing variable, it means that even after using up all of the bits in the one packing variables, one cannot pack the given set L of variables. It means that there is no way in which these L variables can be packed in one packing variable. Consequently, one can find the size of the Out variable that one or more embodiments of the invention returns. Because the techniques described herein can terminate in linear time, one can perform in linear time as well.

The optimal packing algorithm detailed herein can solve the bin-packing challenges without taking into consideration any possible constraints (interference) between them. The W-SSA transform programs and powers-of-two representation of variables enable one to do optimal packing of variables, but that may not take into consideration the interference between the variables. As such, the alleged simplicity of the algorithm can result in the usage of more numbers of bits by the packing algorithm to pack all the variables than optimally required.

Also, if a program is in W-SSA form, the bitwidth information of the variables is represented using powers-of-two representation and all of the variables in the program interfere with each other, then the solution provided by one or more embodiments of the invention would lead to an allocation of a minimum number of registers. Because all variables interfere with each other, the interference graph is a clique, say of size K. Coloring this clique would require K number of colors. The optimal variable packing described herein would ensure that the variables are packed in such a way that there are no "holes," and the resulting graph would still be a clique of size K'≤K.

Additionally, one or more embodiments of the invention include improving the packing precision by coalescing. FIG. 8 is a diagram illustrating exemplary impact of coalescing on variable packing, according to an embodiment of the present invention. By way of illustration, FIG. 8 depicts an a(16) component 802, a b(16) component 804, a c(16) component 806, a d(16) component 808 and an e(16) component 810.

FIG. 8 depicts an example that demonstrates the importance of coalescing in bitwidth aware register allocation. The figure shows an interference graph of five variables in a program. Many existing approaches do not take into consideration the possible noninterference between two variables at the time of packing, but rather, they pack two variables only if the variables interfere. Such a scheme would pack neighbors a with b, and after that it would not be able to pack any further. It will invoke the register allocator for allocation of four variables.

On the other hand, the optimal packing algorithm of one or more embodiments of the invention would pack two pairs of variables and invoke the register allocator for allocation of three variables. It may be noted that because b, c, d, and e do not interfere with each other, they all can be coalesced together into one single variable n, and the final coalesced variable would still take only 16 bits. That is, one needs a scheme of bitwidth aware variable coalescing. In the presence of such a scheme, a and n can be packed together into one single variable, and the register allocator needs to allocate only one variable.

Also, with respect to the W-SSA form, because one can break the live ranges into independent smaller ones, the optimal packing algorithm of one or more embodiments of the invention might end up packing multiple W-SSA variables of a variable into the same packing variable, thereby consuming more numbers of bits than required. For example, assume that one has a variable that requires 16 bits, 8 bits, and 16 bits over a span of three consecutive live ranges. This variable gets translated into three W-SSA variables. The techniques described herein can pack these three variables requiring total 40 bits because the algorithm used is oblivious to the lack of interference among variables. The result is a packing assuming complete interference among different variables.

Further, one or more embodiments of the invention include a pre-pass to an algorithm that can coalesce non interfering variables. FIG. 9 is a diagram illustrating bitwidth register allocation with coalescing, according to an embodiment of the present invention. By way of illustration, FIG. 9 depicts a bitwidth aware coalescing component 902, which sends coalesced variables to a variable packing component 904, which sends packing information to a global register allocation component 906. Note that the phase of coalescing preferably runs before variable packing phase. This would ensure that non-interfering variables are already coalesced and no two variables which can be coalesced are packed into one single packing variable.

Also, one or more embodiments of the invention include a heuristic-based solution to bitwidth aware variable coalescing. Unlike coalescing targeted for register allocation, coalescing for variable packing has a different goal. For example, assume one has two variables a and b that do not interfere. Coalescing them together might be a good idea for register allocation (assuming no other complications from the interference with other variables). However, in other cases, one might like to merge a and b only if merging the two does not increase the bit pressure at any program point.

As such, if both a and b have the same size, then coalescing them together does not increase the bit pressure. For example, assume one has two W-SSA variables, one of size 16 bits and the other of 2 bits. If one coalesces them, then one will be increasing the bit pressure at the program point where the second variable is live. It may be noted that for some purposes, the lower the bit pressure, the better it is for one to pack the variables more densely. One may want to make sure that the heuristic used for coalescing should not deteriorate the packing in the following phase.

By way of example, given a set of W-SSA variables V (and their widths) and interference among them, one may want to attempt to find a coalescing such that it will not deteriorate the quality of packing in the following phase. The problem definition states that after optimal packing, bit pressure at any program point should not increase because of the previous invocation of the coalescing phase. One way to think about coalescing is that aggressive coalescing can merge many variable pairs and that would result in reduced bit pressure at all program points. A typical problem with coalescing is that, if aggressively done, it can impact the target problem in a negative way. As such, the techniques detailed herein illustrate that, under a set of constraints, one can do very aggressive coalescing without deteriorating the quality of variable packing.

An exemplary set of constraints can include the program being in W-SSA form, and the size of any W-SSA variable being in the set $\{2^i | 0 \leq i \leq r\}$. Under these constraints, for example, given a set V of W-SSA variables, FIG. 10 provides an algorithm to do safely-aggressive coalescing. FIG. 10 is a diagram illustrating an exemplary coalescing algorithm 1002, according to an embodiment of the present invention. This exemplary algorithm is an aggressive coalescing algorithm that is aware of the size of the variables under consideration for coalescing.

As depicted in FIG. 10, function SafelyAggressiveCoalesce is the entry point of this algorithm that does coalescing in a staged manner. It first initializes a "contains" map C, and map $C(v_i)$ returns the set of root variables corresponding to all of the W-SSA variables contained in $v_i$. For each possible distinct variable size, one can iteratively coalesce all of the possible variables aggressively (BucketCoalesce) and pack pairs of these coalesced variables into one of the larger size (PackBucket).

With respect to function BucketCoalesce, in the set of W-SSA variables that have the same size (referred to herein as a bucket), one can try to coalesces pairs of variables that do not interfere. The function SelectList (V, i) returns a list of variables with size $2^i$. The set Interf includes the set of all interfering pairs of variables. For each interfering pair of variables (u, v), lines 14-17 remove both u and v from the worklist w, and the set of current variables V create a new coalesced variable x, and add it to both w and V. Line 18 updates the map C for the coalesced variable, and lines 19-20 update the interference information of the coalesced variable based on the interference of the variables u and v.

In connection to function PackBucket, one can try to pack two variables of size $2^i$ into a variable of size $2^{i+1}$. The packing of one or more embodiments of the invention is based on one single restriction that the variables do not contain any common root variables. As such, if one ever packs two W-SSA variables, $v_1$ and $v_2$, generated from a root variable, v, into a single packing variable, one might end up increasing the bit pressure. In lines 30-31, a new variable, x, is created that includes $v_1$ and $v_2$, and is added to V. The C map and interference information is updated in lines 32-34.

Each invocation of BucketCoalesce takes $O(n^2)$ time, where n is the number of variables in the program. Note that the Interf set can be represented as a two dimensional array and the insertion, search and delete operations can all be done in constant time. It may also be noted that function UpdateInterference takes O(n) time. Also, function PackBucket takes $O(n^2)$ time. Because r is a constant for most of the time, the algorithm has a worst case complexity of $O(n^2)$.

By way of example, take the instance depicted in FIG. 8 and apply a coalescing algorithm, as detailed herein. It would first coalesce two variables, b and c, into n, and update the C and interference maps in the first iteration of BucketCoalesce function. In the next iteration, it will coalesce n with d, and in the next iteration, it will coalesce e. Also, assume that the final coalesced variable is n'. One or more embodiments of the invention will invoke the PackBucket algorithm that will pack n' with a and create a single new 32 bit variable.

Additionally, for example, the algorithm presented in FIG. 10 meets coalescing criteria proposed herein. Every time one or more embodiments of the invention coalesces variables, it has a positive impact on the packing as it reduces the number of available variables. Further, the techniques described herein also illustrate that, in this function, one will never have a case where two W-SSA variables of a single root variable will be packed into the same variable. One can pack two variables, u and v, only if none of the variables contained in these two variables share the root variable. As depicted in FIG. 10, the condition at line 27 ensures this. Also, this ensures that one will never pack two W-SSA variables corresponding to a single root variable.

It can be noted that the coalescing safety criteria does not take into account the optimality of the algorithm in terms of number and size of coalesced variables. This is done to keep the issues of optimality and safety separate. The techniques described herein ensure that the lack of optimality should not be made an excuse to impact the next phase of packing in a negative way.

FIG. 11 is a diagram illustrating a chart 1102 depicting benchmark line numbers, according to an embodiment of the present invention. FIG. 11 reports the number of source lines of the benchmarks, wherein all of the benchmarks have only one main function. Even though the benchmarks in this example are small in size, the programs include many representative bitwise kernels which are of interest.

FIG. 12 is a diagram illustrating a table 1202 depicting a comparison of packing and coalescing algorithms, according to an embodiment of the present invention. FIG. 13 is a diagram illustrating a table 1302 depicting a comparison of packing and coalescing algorithms, according to an embodiment of the present invention.

FIG. 12 and FIG. 13 compare the performance of packing and coalescing techniques described herein against the packing algorithm described by an exemplary existing approach. The bitwidth information for all variables at all program points is computed using a static analysis and is provided as an input to all of the algorithms. Note the significant increase in the number of "original pseudos" in FIG. 13, as compared to FIG. 12. This is mainly due to the fact that a GCC compiler keeps many of the program variables in memory when invoked with a –O0 (un-optimized) option.

In one or more embodiments of the invention, to optimize packing and coalescing algorithms, the programs should preferably be in W-SSA form. For example, the number of W-SSA variables is shown in column 5 of FIG. 12 and FIG. 13 for both optimized and un-optimized case. Also, because multiple W-SSA variables can be created based on varying sizes of a variable, the number of W-SSA variables generated (column 5) is either equal or more than the number of original pseudo variables in the RTL (column 2). By way of example, on average, the number of W-SSA variables can be double the number of original SSA variables.

For comparing the effectiveness of packing algorithms, consider the results obtained from an un-optimized run of the benchmark programs (for example, as illustrated in FIG. 12). Using variable packing algorithm of the exemplary existing approach, the reduction in number of variables is, at most, by 19.04% (as can be seen in column 4 and benchmark bubble-sort). Using the techniques described herein, the reduction in the number of W-SSA variables compared to the number of W-SSA variables is reasonably good (up to 47.42%, as can be seen in column 7 and benchmark bilint).

The coalescing and packing algorithm used in one or more embodiments of the invention significantly improves the number of packed W-SSA variables (for example, up to 97.93% in column 9 of FIG. 12 for bilint benchmark). All of the benchmarks require four or less 32-bit variables to pack all of the variables in the program. This is mainly due to the fact that the register transfer level (RTL) code in its un-optimized version represents many of the program variables in memory, and every access is surrounded by load and store instructions. An exemplary source code and its un-optimized translation by GCC can include the following:

$$x = x + 1 \quad \left|\begin{array}{l} \text{load } TempX; \\ \text{Incr } TempX; \\ \text{Store } TempX; \end{array}\right.$$

Such a code results in a large number of temporaries having very small live ranges, most of which can be coalesced.

With respect to FIG. 13, similar to the un-optimized case, the number of packed variables in column 9 shows that the coalescing+packing phase of the techniques described herein performs better than the algorithm used in the exemplary existing approach (column 3).

The last two columns of FIG. 12 and FIG. 13 depict the percentage reduction in the number of variables as compared to the original set of variables (column 2) and the set of packed variables as given by the exemplary existing approach (column 3). As compared to the original set of variables, the techniques detailed herein can reduce the number of variables by up to 97% in compilation without other optimizations turned on, and by up to 78% in compilation with optimizations turned on. Compared to the exemplary existing approach, one or more embodiments of the invention provide a further reduction in the number of variables by up to 98% (averaging 83.76%) in compilation without other optimizations turned on, and by up to 73% (averaging 52.27%) in compilation with optimizations turned on.

Figure 14:
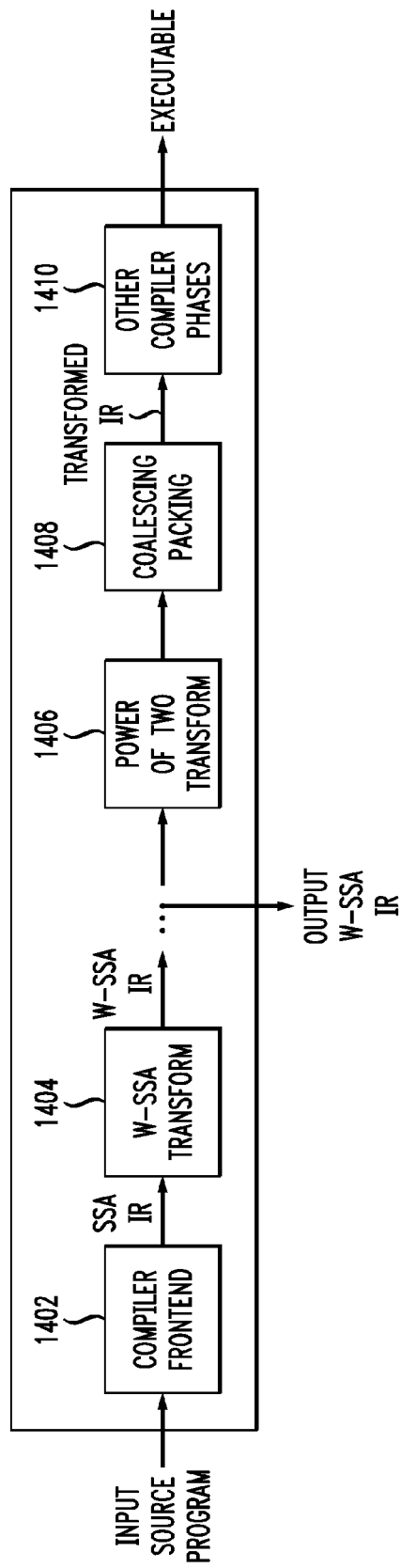
FIG. 14 is a diagram illustrating an overall framework for W-SSA transformation and variable packing and coalescing, according to an embodiment of the present invention.

FIG. 14 is a diagram illustrating an overall framework for W-SSA transformation and variable packing and coalescing, according to an embodiment of the present invention. By way of illustration, FIG. 14 depicts a compiler front-end component 1402, which receives input source program and sends SSA intermediate representation (IR) to a W-SSA transform component 1404, which outputs a W-SSA IR and also sends a W-SSA IR to a power of two transform component 1406. The power of two transform component 1406 leads to a coalescing packing component 1408, which sends transformed IR to an other compiler phases component 1410, which produces an executable output.

Figure 15:
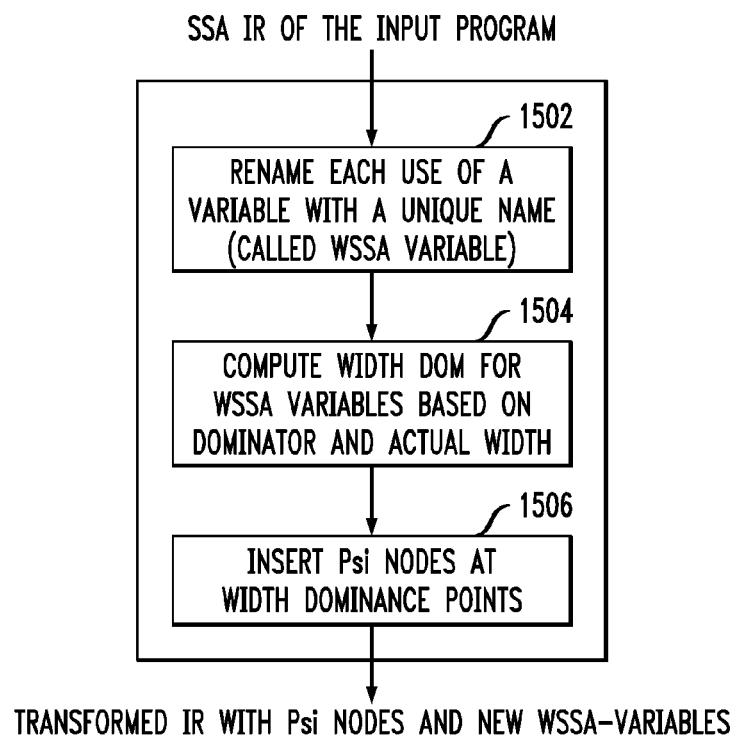
FIG. 15 is a diagram illustrating techniques for performing a W-SSA transform, according to an embodiment of the present invention.

FIG. 15 is a diagram illustrating techniques for performing a W-SSA transform, according to an embodiment of the present invention. After receiving SSA IR of the input program, step 1502 includes renaming each use of a variable with a unique name (that is, a wssa variable). Step 1504 includes computing w-dominators for wssa variables based on dominator and actual width. Also, step 1506 includes inserting T nodes at width dominance points. FIG. 15 also depicts outputting the transformed IR with T nodes and new wssa-variables.

Figure 16:
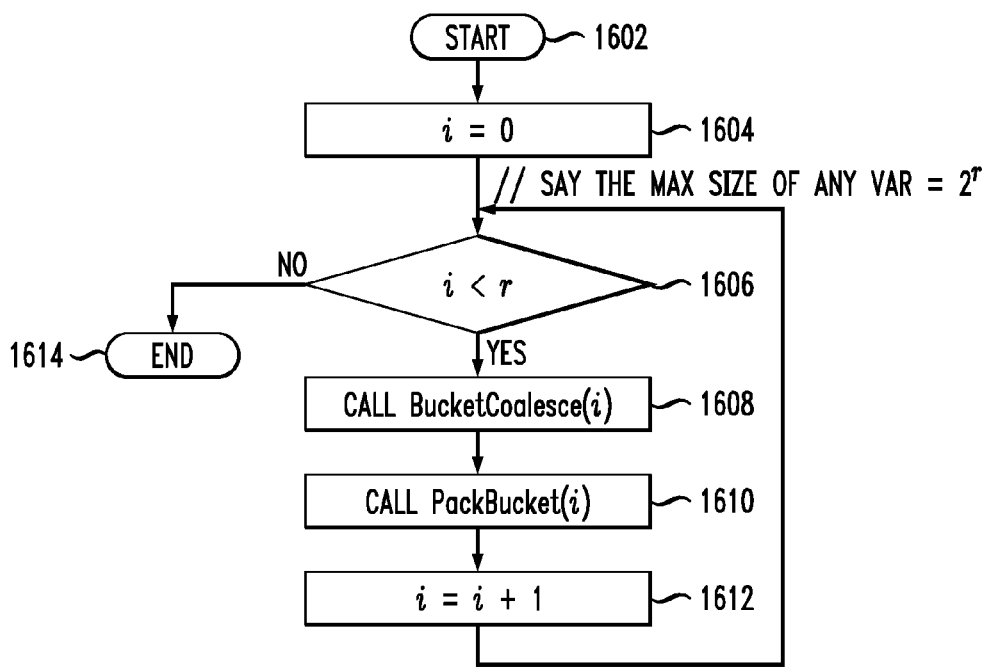
FIG. 16 is a flow diagram illustrating the entry function to do safe aggressive coalescing, according to an embodiment of the present invention.

FIG. 16 is a flow diagram illustrating the entry function to do safe aggressive coalescing, according to an embodiment of the present invention. Step 1602 includes starting the process. Step 1604 includes initializing the variable i (that is, i=0). Step 1606 includes determining if "i" is less than "r." If the answer is no, then one can proceed to the end at step 1614. If the answer is yes, then one proceeds to step 1608, which includes calling BucketCoalesce(i) (that is, invoking the function BucketCoalesce(i)). Step 1610 includes calling PackBucket(i). Also, step 1612 includes incrementing the value of i, thereby moving on to the higher bucket in the next iteration (that is, i=i+1), which returns one to step 1606.

Figure 17:
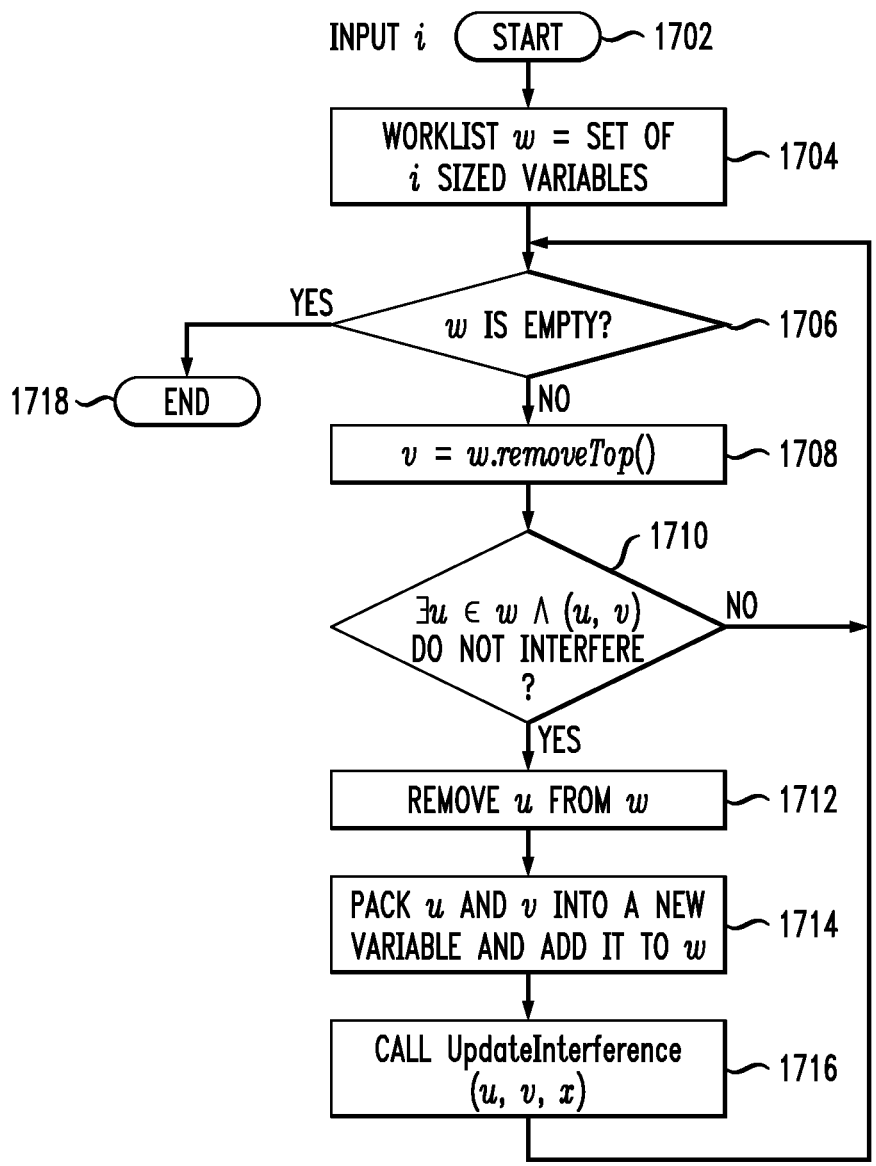
FIG. 17 is a flow diagram illustrating function BucketCoalesce, according to an embodiment of the present invention.

FIG. 17 is a flow diagram illustrating function BucketCoalesce, according to an embodiment of the present invention. Step 1702 includes starting the process. Step 1704 includes initializing and/or determining w (that is, worklist w=set of i sized variables (wherein i is the input)), to be used subsequently. Step 1706 includes determining if w is empty. If the answer is yes, then one can proceed to the end at step 1718. If the answer is no, then one proceeds to step 1708, which includes removing the top element from the worklist and assigning it to v (that is, v=w.removeTop( )). Step 1710 includes determining if there exists another variable u in the worklist w, such that u and v do not interfere.

Additionally, step 1712 includes removing u from w. Step 1714 includes packing u and v into a new variable and adding it to w. Also, step 1716 includes calling UpdateInterference (u,v,x).

Figure 18:
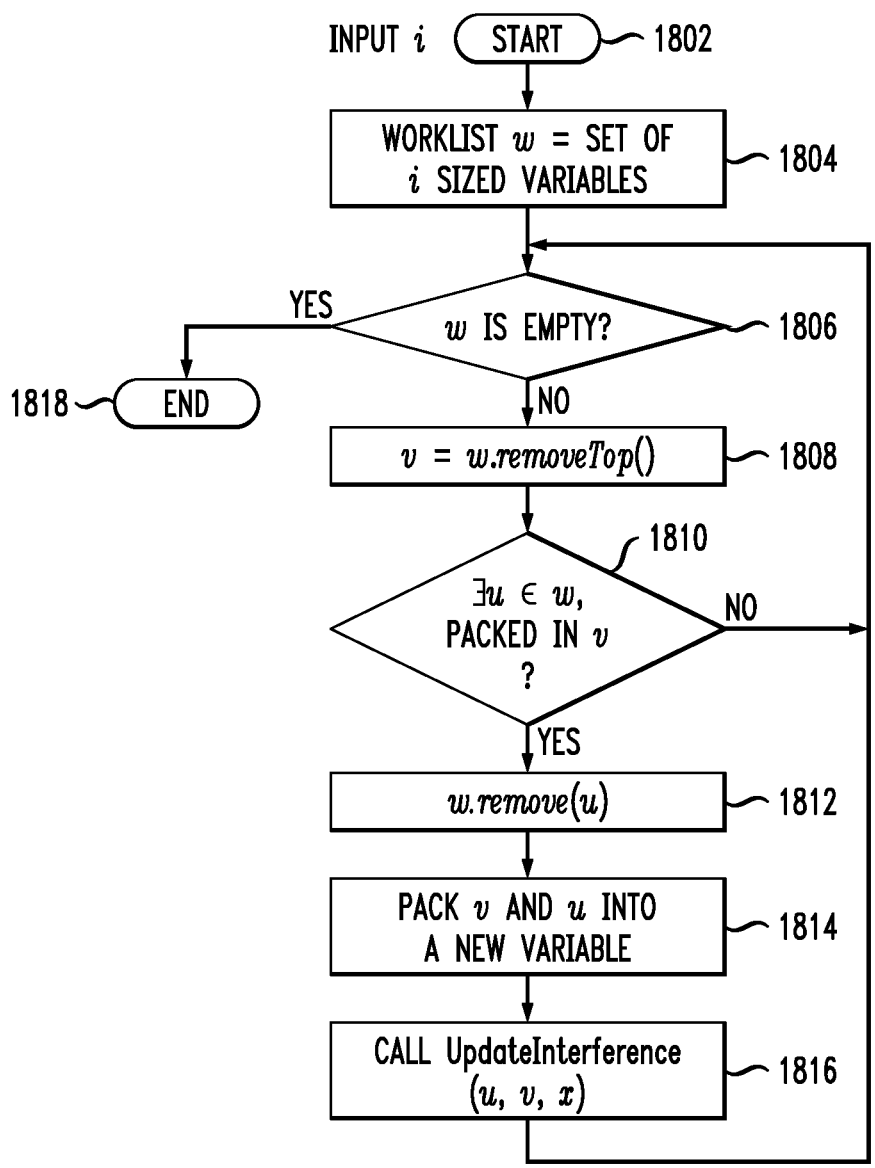
FIG. 18 is a flow diagram illustrating function PackBucket, according to an embodiment of the present invention.

FIG. 18 is a flow diagram illustrating function PackBucket, according to an embodiment of the present invention. Step 1802 includes starting the process. Step 1804 includes initializing the worklist w (that is, worklist w=set of i sized variables (wherein i is the input)). Step 1806 includes determining if w is empty. If the answer is yes, then one can proceed to the end at step 1818. If the answer is no, then one proceeds to step 1808, which includes removing the top element from the worklist and assigning it to v (that is, v=w.removeTop( )). Step 1810 includes determining if there exists another variable u in the worklist w, such that u is already packed within v.

Additionally, step 1812 includes removing u from the worklist, as it is already present within v (that is, w.remove (u)). Step 1814 includes packing u and v into a new variable. Also, step 1816 includes calling UpdateInterference(u,v,x).

Figure 19:
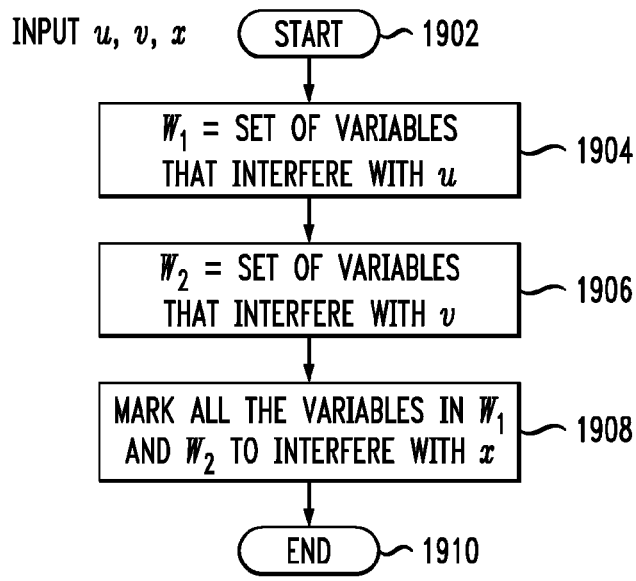
FIG. 19 is a flow diagram illustrating utility function UpdateInterference, according to an embodiment of the present invention.

FIG. 19 is a flow diagram illustrating utility function UpdateInterference, according to an embodiment of the present invention. Step 1902 includes starting the process. Step 1904 includes initializing and/or determining $W_1$ (that is, $W_1$=Set of variables that interfere with u). Step 1906 includes initializing and/or determining $W_2$ (that is, $W_2$=Set of variables that interfere with v). Step 1908 includes marking all the variables in $W_1$ and $W_2$ to interfere with x. Also, step 1910 includes ending the process.

Figure 20:
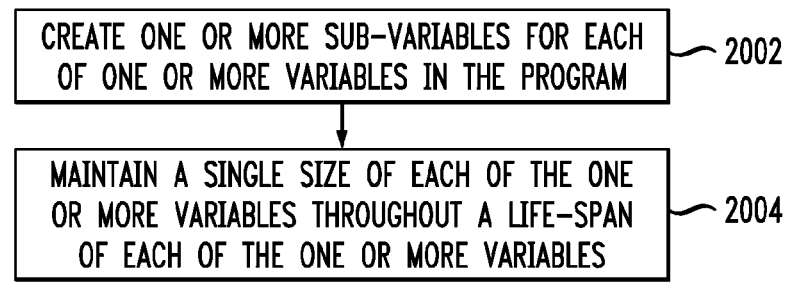
FIG. 20 is a flow diagram illustrating techniques for representing a program, according to an embodiment of the present invention.

FIG. 20 is a flow diagram illustrating techniques for representing a program, according to an embodiment of the present invention. Step 2002 includes creating one or more sub-variables for each of one or more variables in the program. Step 2004 includes maintaining a single size of each of the one or more variables throughout a life-span of each of the one or more variables. Maintaining a single size of each variable can include maintaining a width associated with each variable throughout the life-span of each variable.

The techniques depicted in FIG. 20 also include using a temporary variable for each of one or more assignments in the program, as well as using the temporary variable in each remaining place in the program, wherein the value from each assignment is used.

Figure 21:
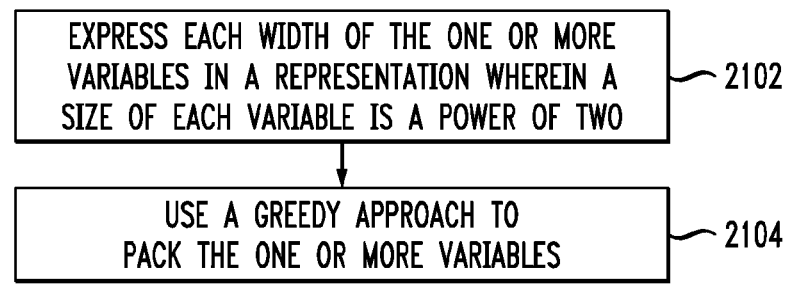
FIG. 21 is a flow diagram illustrating techniques for packing one or more variables of a program within a compiler, according to an embodiment of the present invention.

FIG. 21 is a flow diagram illustrating techniques for packing one or more variables of a program (for example, a computer program) within a compiler, according to an embodiment of the present invention. The program can include, for example, a program in width-single static assignment (W-SSA) form. Step 2102 includes expressing each width of the one or more variables in a representation wherein a size of each variable is a power of two. Step 2104 includes using a greedy approach (that is, packing the largest variables first) to pack the one or more variables.

Figure 22:
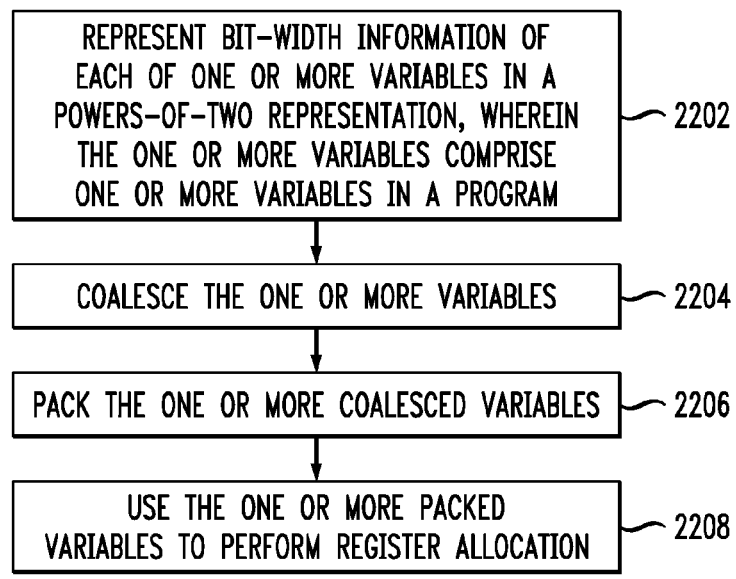
FIG. 22 is a flow diagram illustrating techniques for performing register allocation, according to an embodiment of the present invention.

FIG. 22 is a flow diagram illustrating techniques for performing register allocation, according to an embodiment of the present invention. Step 2202 includes representing bit-width information of each of one or more variables in a powers-of-two representation, wherein the one or more variables comprise one or more variables in a program. The program can include a program in width-single static assignment (W-SSA) form. Step 2204 includes coalescing the one or more variables. Coalescing the variables can include using heuristic-based coalescing to coalesce the variables, and coalescing includes reducing the number of available variables for packing.

Step 2206 includes packing the one or more coalesced variables. Packing the coalesced variables can include bit-width aware variable packing, as well as packing the coalesced variables in linear time. In packing the coalesced variables, one can also incorporate a restriction that the variables do not contain a common root variable. Step 2208 includes using the one or more packed variables to perform register allocation.

The techniques depicted in FIG. 22 can also include transforming a program in single static assignment (SSA) form to width-single static assignment (W-SSA) form.

A variety of techniques, utilizing dedicated hardware, general purpose processors, software, or a combination of the foregoing may be employed to implement the present invention. At least one embodiment of the invention can be implemented in the form of a computer product including a computer usable medium with computer usable program code for performing the method steps indicated. Furthermore, at least one embodiment of the invention can be implemented in the form of an apparatus including a memory and at least one processor that is coupled to the memory and operative to perform exemplary method steps.

Figure 23:
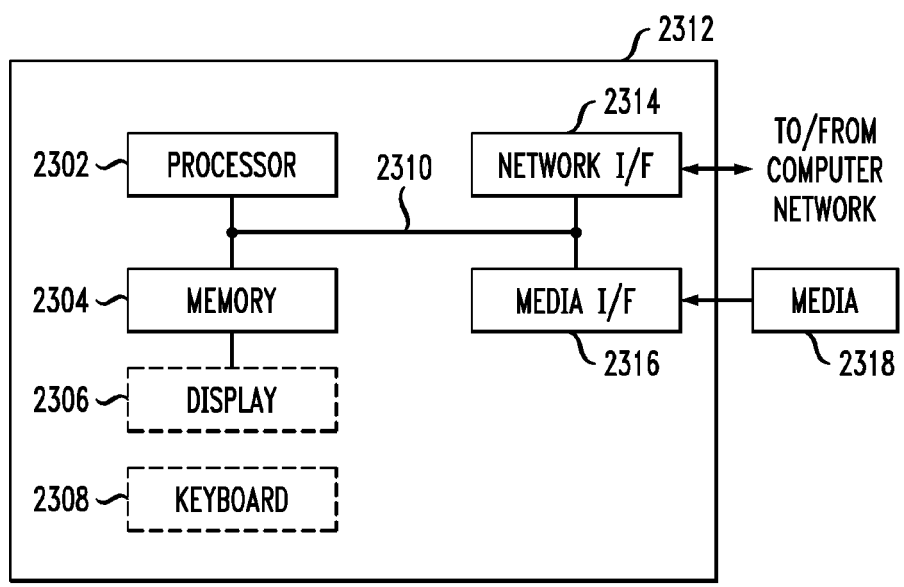
FIG. 23 is a system diagram of an exemplary computer system on which at least one embodiment of the present invention can be implemented.

At present, it is believed that the preferred implementation will make substantial use of software running on a general-purpose computer or workstation. With reference to FIG. 23, such an implementation might employ, for example, a processor 2302, a memory 2304, and an input and/or output interface formed, for example, by a display 2306 and a keyboard 2308. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory), ROM (read only memory), a fixed memory device (for example, hard drive), a removable memory device (for example, diskette), a flash memory and the like. In addition, the phrase "input and/or output interface" as used herein, is intended to include, for example, one or more mechanisms for inputting data to the processing unit (for example, mouse), and one or more mechanisms for providing results associated with the processing unit (for example, printer). The processor 2302, memory 2304, and input and/or output interface such as display 2306 and keyboard 2308 can be interconnected, for example, via bus 2310 as part of a data processing unit 2312. Suitable interconnections, for example via bus 2310, can also be provided to a network interface 2314, such as a network card, which can be provided to interface with a computer network, and to a media interface 2316, such as a diskette or CD-ROM drive, which can be provided to interface with media 2318.

Accordingly, computer software including instructions or code for performing the methodologies of the invention, as described herein, may be stored in one or more of the associated memory devices (for example, ROM, fixed or removable memory) and, when ready to be utilized, loaded in part or in whole (for example, into RAM) and executed by a CPU. Such software could include, but is not limited to, firmware, resident software, microcode, and the like.

Furthermore, the invention can take the form of a computer program product accessible from a computer-usable or computer-readable medium (for example, media 2318) providing program code for use by or in connection with a computer or any instruction execution system. For the purposes of this description, a computer usable or computer readable medium can be any apparatus for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid-state memory (for example, memory 2304), magnetic tape, a removable computer diskette (for example, media 2318), a random access memory (RAM), a read-only memory (ROM), a rigid magnetic disk and an optical disk. Current examples of optical disks include compact disk-read only memory (CD-ROM), compact disk-read and/or write (CD-R/W) and DVD.

A data processing system suitable for storing and/or executing program code will include at least one processor 2302 coupled directly or indirectly to memory elements 2304 through a system bus 2310. The memory elements can include local memory employed during actual execution of the program code, bulk storage, and cache memories which provide temporary storage of at least some program code in order to reduce the number of times code must be retrieved from bulk storage during execution.

Input and/or output or I/O devices (including but not limited to keyboards 2308, displays 2306, pointing devices, and the like) can be coupled to the system either directly (such as via bus 2310) or through intervening I/O controllers (omitted for clarity).

Network adapters such as network interface 2314 may also be coupled to the system to enable the data processing system to become coupled to other data processing systems or remote printers or storage devices through intervening private or public networks. Modems, cable modem and Ethernet cards are just a few of the currently available types of network adapters.

In any case, it should be understood that the components illustrated herein may be implemented in various forms of hardware, software, or combinations thereof, for example, application specific integrated circuit(s) (ASICS), functional circuitry, one or more appropriately programmed general purpose digital computers with associated memory, and the like. Given the teachings of the invention provided herein, one of ordinary skill in the related art will be able to contemplate other implementations of the components of the invention.

At least one embodiment of the invention may provide one or more beneficial effects, such as, for example, performing bit-width aware variable packing optimally in linear time.

Although illustrative embodiments of the present invention have been described herein with reference to the accompanying drawings, it is to be understood that the invention is not limited to those precise embodiments, and that various other changes and modifications may be made by one skilled in the art without departing from the scope or spirit of the invention.

What is claimed is:

1. A method for performing register allocation, comprising the steps of:
   representing a program in width-single static assignment (W-SSA) form, wherein said representing comprises:
   creating one or more sub-variables for each of a plurality of variables in the program; and
   maintaining a single size of each of the plurality of variables throughout a life-span of each of the plurality of variables;
   coalescing the plurality of variables based on a size determination for each variable to produce a plurality of coalesced variables, wherein said coalescing comprises:
   coalescing, for each distinct variable size among the plurality of variables, non-interfering variables having the same size so as not to increase the bit pressure at any program point;
   removing each pair of interfering variables from the plurality of variables;
   creating a new coalesced variable to replace each pair of removed interfering variables; and
   adding the new coalesced variable to the plurality of coalesced variables;
   packing the plurality of coalesced variables; and
   using the plurality of packed variables to perform register allocation.

2. The method of claim 1, wherein packing the plurality of coalesced variables comprises bitwidth aware variable packing.

3. The method of claim 1, wherein coalescing the plurality of variables comprises using heuristic-based coalescing to coalesce the plurality of variables.

4. The method of claim 1, wherein packing the plurality of coalesced variables comprises packing the plurality of coalesced variables in linear time.

5. The method of claim 1, wherein coalescing the plurality of variables comprises reducing a number of available variables for packing.

6. The method of claim 1, wherein packing the plurality of coalesced variables comprises incorporating a restriction that the plurality of variables do not contain a common root variable.

7. The method of claim 1, further comprising transforming a program in single static assignment (SSA) form to width-single static assignment (W-SSA) form.

8. A system for performing register allocation, comprising:
   a memory; and
   at least one processor coupled to said memory and operative to:
   represent a program in width-single static assignment (W-SSA) form, wherein in representing the program, the at least one processor coupled to said memory is further operative to:
   create one or more sub-variables for each of a plurality of variables in the program; and
   maintain a single size of each of the plurality of variables throughout a life-span of each of the plurality of variables;
   coalesce the plurality of variables based on a size determination for each variable to produce a plurality of coalesced variables, wherein said coalescing comprises:
   coalesce, for each distinct variable size among the plurality of variables, non-interfering variables having the same size so as not to increase the bit pressure at any program point;
   remove each pair of interfering variables from the plurality of variables;
   create a new coalesced variable to replace each pair of removed interfering variables; and
   add the new coalesced variable to the plurality of coalesced variables;
   pack the plurality of coalesced variables; and
   use the plurality of packed variables to perform register allocation.

9. The system of claim 8, wherein in packing the plurality of coalesced variables, the at least one processor coupled to said memory is further operative to express each width of the plurality of variables in a representation wherein a size of each variable is a power of two.

10. The system of claim 8, wherein in packing the plurality of coalesced variables, the at least one processor coupled to said memory is further operative to use a greedy approach to pack the plurality of variables.

11. The system of claim 8, wherein the at least one processor coupled to said memory is further operative to:
   use a temporary variable for each of one or more assignments in the program; and
   use the temporary variable in each remaining place in the program, wherein a value from each assignment is used.

12. The system of claim 8, wherein in maintaining a single size of each of the plurality of variables, the at least one processor coupled to said memory is further operative to maintain a width associated with each of the plurality of variables throughout the life-span of each of the plurality of variables.

13. The system of claim 8, wherein in coalescing the plurality of variables, the at least one processor coupled to said memory is further operative to use heuristic-based coalescing to coalesce the plurality of variables.

14. The system of claim 8, wherein in packing the plurality of coalesced variables, the at least one processor coupled to said memory is further operative to pack the plurality of coalesced variables in linear time.

* * * * *